(No Model.)
A. P. TENISON.
RIDING SADDLE.
No. 506,747. Patented Oct. 17, 1893.
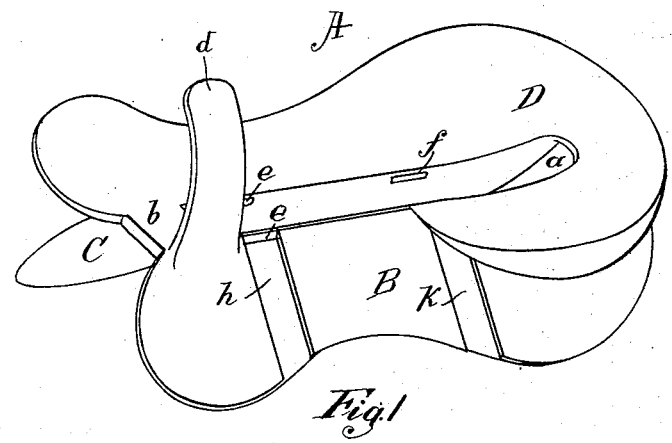
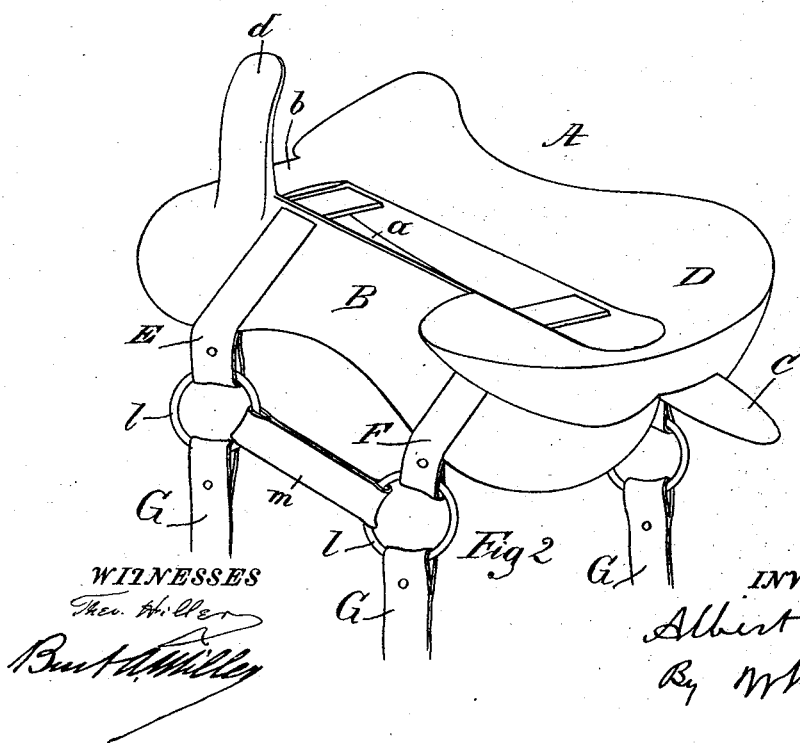

UNITED STATES PATENT OFFICE.

ALBERT P. TENISON, OF DALLAS, TEXAS.

RIDING-SADDLE.

SPECIFICATION forming part of Letters Patent No. 506,747, dated October 17, 1893.

Application filed July 6, 1893. Serial No. 479,772. (No model.)

*To all whom it may concern:*

Be it known that I, ALBERT P. TENISON, a citizen of the United States, and a resident of Dallas, county of Dallas, State of Texas, have invented a new and useful Improvement in Side-Saddle Trees, of which the following is a full, clear, and exact description, reference being had to the accompanying drawings, making part of this specification.

My invention relates to improvements in side saddle trees, and consists in providing means whereby the saddle may be more firmly secured to the animal.

With this object in view my invention relates to certain features of construction and combination of parts as will be hereinafter described and pointed out in the claim.

Figure 1 of the accompanying drawings is is a view in perspective from the left front of a saddle tree illustrating my invention, and Fig. 2, is a similar view from the left rear showing the tree and girth straps in operative position on the tree.

Referring to the drawings, A represents the saddle tree having side bars B, and C, that are spaced apart and secured in desired parallel position by the cantle D, beginning at and covering the upper rear portion of the bar B, to which it is secured, and extended across the open space $a$ to the rear portion of the side bar C, to which it is secured, thence along the upper edge to the front end portion of the bar, at which point is provided a bridge piece $b$, by which the front end portion of the cantle and bar C, are connected with the bar B, thus forming a tree having parallel side bars spaced apart to provide a ventilating space $a$ from front to rear under the bridge $b$ and rear portion of the cantle D, which extends from the rear portion of the bar B to the front portion of bar C. The horn $d$ is secured to the front portion of the bar B, in the usual way.

At the upper portion of the side bars B and C, at the front and rear portions of the tree, is provided corresponding elongated apertures $e$ $e$, and $f f$, and grooves $h$ and $k$, leading across the bar and up to the apertures, the purpose of which is to receive the girth support hereinafter described. If preferred the apertures $f f$ may be formed by a continuation of the grooves $k$, up to and through the upper edge of tree and covered by the cantle.

The girth support is formed of the straps E and F, which may be made of any suitable material and placed in the grooves $h$ and $k$, and through the apertures $e$ and $f$; at the ends of the straps E and F, are provided metal rings $l$ and a connecting strap $m$.

The girths G are secured in the rings $l$ as shown, the free ends of which are adapted to embrace the body of the animal. It will be seen that the straps E and F may move a distance in the grooves over the tree, and by this provision of a double rig or two girths as shown, the saddle can be more securely attached to the animal than heretofore.

Having thus fully described the nature and the object of my invention, what I claim, and desire to secure by Letters Patent, is—

The combination in a side saddle tree of the side bars B and C, having therein apertures $e$ and $f$, and grooves $h$ and $k$ of the cantle, extending from the left rear portion of the bar B to the rear portion of bar C, and forward to the front thereof, the bridge $b$ and the longitudinal central opening $a$ between the bars and under the bridge and cantle, substantially as described and for the purpose set forth.

In testimony whereof I have hereunto set my hand this 13th day of June, A. D. 1893.

ALBERT P. TENISON.

Witnesses:
A. T. BIGGERS,
A. L. O'NEALE.